(12) United States Patent
Islam et al.

(10) Patent No.: US 11,272,429 B2
(45) Date of Patent: Mar. 8, 2022

(54) INITIATION OF MOBILITY REFERENCE SIGNAL BASED ON QUALITY OF INITIAL ACCESS SIGNALS

(71) Applicant: QUALCOMM Incorporated, San Diego, CA (US)

(72) Inventors: Muhammad Nazmul Islam, Edison, NJ (US); Sundar Subramanian, Bridgewater, NJ (US); Bilal Sadiq, Basking Ridge, NJ (US); Juergen Cezanne, Ocean Township, NJ (US); Ashwin Sampath, Skillman, NJ (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/894,333

(22) Filed: Feb. 12, 2018

(65) Prior Publication Data

US 2018/0234912 A1 Aug. 16, 2018

Related U.S. Application Data

(60) Provisional application No. 62/458,359, filed on Feb. 13, 2017, provisional application No. 62/547,697, filed on Aug. 18, 2017.

(51) Int. Cl.
*H04W 48/10* (2009.01)
*H04W 24/08* (2009.01)
(Continued)

(52) U.S. Cl.
CPC .......... *H04W 48/10* (2013.01); *H04W 24/08* (2013.01); *H04W 36/0072* (2013.01);
(Continued)

(58) Field of Classification Search
CPC . H04W 48/10; H04W 88/08; H04W 36/0072; H04W 16/28
(Continued)

(56) References Cited

U.S. PATENT DOCUMENTS

| 9,380,582 B2 * | 6/2016 | Li ...................... H04B 7/0408 |
| 2013/0235742 A1 * | 9/2013 | Josiam ................ H04B 7/0695 370/252 |

(Continued)

FOREIGN PATENT DOCUMENTS

| CN | 102098770 A | 6/2011 |
| CN | 103765794 A | 4/2014 |

(Continued)

OTHER PUBLICATIONS

Huawei et al., "Mechanism of shared CSI-RS transmission", 3GPP Draft; R1-1700058, 3rd Generation Partnership Project (3GPP), Mobile Competence Centre; 650, Route Des Lucioles; F-06921 Sophia-Antipolis Cedex; France, vol. RAN WG1, No. Spokane. USA; Jan. 16, 2017-Jan. 20, 2017, Jan. 16, 2017 (Jan. 16, 2017), XP051207600, Retrieved from the Internet: URL:http://www.3gpp. org/ftp/Meetings_3GPP_SYNC/RAN1/Docs/ [retrieved on Jan. 16, 2017].

(Continued)

*Primary Examiner* — Shripal K Khajuria
(74) *Attorney, Agent, or Firm* — Patterson & Sheridan, LLP

(57) ABSTRACT

Certain aspects of the present disclosure relate to methods and apparatus for limiting UE capability information reported in a network. For example, a method of wireless communications by a first base station may include transmitting a first set of initial access signals in different directions, receiving a second set of one or more signals from a user equipment (UE) in response to the first set of (Continued)

initial access signals, and initiating transmission of, or conveying configuration of, a third set of reference signals with an indication of their corresponding directions, based on reception of the second set of signals.

35 Claims, 14 Drawing Sheets

(51) Int. Cl.
*H04W 36/00* (2009.01)
*H04W 88/02* (2009.01)
*H04W 88/08* (2009.01)
*H04W 16/28* (2009.01)

(52) U.S. Cl.
CPC ............ *H04W 16/28* (2013.01); *H04W 88/02* (2013.01); *H04W 88/08* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 2014/0334402 | A1* | 11/2014 | Chen | H04B 7/024 370/329 |
| 2015/0200755 | A1 | 7/2015 | Hammarwall et al. | |
| 2015/0249517 | A1* | 9/2015 | Seo | H04W 72/042 370/329 |
| 2015/0289235 | A1* | 10/2015 | Park | H04L 5/0053 370/329 |
| 2015/0341877 | A1* | 11/2015 | Yi | H04W 56/001 370/350 |
| 2016/0021548 | A1* | 1/2016 | Raghavan | H04B 7/046 370/329 |
| 2016/0065279 | A1* | 3/2016 | Wang | H04B 7/0456 375/267 |
| 2016/0344524 | A1* | 11/2016 | Kim | H04L 5/0048 |
| 2017/0070312 | A1* | 3/2017 | Yi | H04W 72/0406 |
| 2017/0105112 | A1* | 4/2017 | Park | H04W 8/005 |
| 2017/0230164 | A1* | 8/2017 | Zhang | H04L 5/0023 |
| 2017/0302341 | A1* | 10/2017 | Yu | H04W 72/0446 |
| 2018/0109302 | A1* | 4/2018 | Nagaraja | H04B 7/063 |
| 2019/0089499 | A1* | 3/2019 | Nam | H04L 5/0048 |

FOREIGN PATENT DOCUMENTS

| | | |
|---|---|---|
| CN | 103875191 A | 6/2014 |
| CN | 104541540 A | 4/2015 |
| CN | 105122665 A | 12/2015 |
| CN | 106301669 A | 1/2017 |
| EP | 2905915 A1 | 8/2015 |
| EP | 3101942 A1 | 12/2016 |
| EP | 3122093 A1 | 1/2017 |
| EP | 3471318 A1 | 4/2019 |
| JP | 2015185955 A | 10/2015 |
| JP | 2016520266 A | 7/2016 |
| WO | 2006086429 A2 | 8/2006 |
| WO | 2015156573 A1 | 10/2015 |
| WO | 2015174731 A1 | 11/2015 |
| WO | 2016006964 A1 | 1/2016 |
| WO | 2016159629 A1 | 10/2016 |
| WO | 2017136732 A1 | 8/2017 |
| WO | 2018017163 A1 | 1/2018 |

OTHER PUBLICATIONS

International Search Report and Written Opinion—PCT/US2018/018050—ISA/EPO—dated May 2, 2018.

Lee J., et al., "Coordinated Multipoint Transmission and Reception in LTE-Advanced Systems", IEEE Communications Magazine, IEEE Service Center, Piscataway, US, vol. 50, No. 11, Nov. 1, 2012 (Nov. 1, 2012), XP011472334, pp. 44-50.

Qualcomm Incorporated: "Remaining Details on Measurement for Mobility Management", 3GPP Draft; R1-1718533 Remaining Details on Measurement for Mobility Management, 3rd Generation Partnership Project (3GPP), Mobile Competence Centre; 650, Route Des Lucioles; F-06921 Sophia-Antipoli, vol. RAN WG1, No. Prague; Oct. 9, 2017-Oct. 13, 2017, Oct. 8, 2017 (Oct. 8, 2017), XP051341715, 8 Pages, Retrieved from the Internet: URL:http://www.3gpp.org/ftp/Meetings_3GPP_SYNC/RAN1/Docs/ [retrieved on Oct. 8, 2017].

Ku B.W., et al., "Efficient Beam-Training Technique for Millimeter-Wave Cellular Communications," ETRI Journal, vol. 38, No. 1, Feb. 1, 2016 (Feb. 1, 2016), XP055535407, pp. 81-89, ISSN: 1225-6463, DOI: 10.4218/etrij.16.0114.1294.

Huawei, et al., "QCL Indication of Downlink Control Channel and Beam Management Reference Signals", R1-1700405, 3GPP TSG RAN WG1 NR Ad Hoc Meeting, Spokane, USA, Jan. 16-20, 2017, pp. 1-4.

Taiwan Search Report—TW107105356—TIPO—dated Jun. 27, 2021.

Catt: "QCL Between CSI-RS for Beam Management", 3GPP TSG RAN WG1 #87, R1-161 1388, Reno, USA, Nov. 14, 2016-Nov. 18, 2016, 3 Pages, Nov. 14, 2016, Internet URL: http://www.3gpp.org/ftp/tsg_ran/WG1_RL1/TSGR1_87/Docs/R1-1611388.zip.

LG Electronics: "Discussion on QCL for NR", 3GPP TSG RAN WG1 Meeting #88, R1-1702466, Athens, Greece, Feb. 13-17, 2017, pp. 1-3, Feb. 7, 2017, Internet URL: http://www.3gpp.org/ftp/tsg_ran/WG1_RL1/TSGR1_88/Docs/R1-1702466.zip.

* cited by examiner

INITIATION OF MOBILITY REFERENCE SIGNAL BASED ON QUALITY OF INITIAL ACCESS SIGNALS

CLAIM OF PRIORITY UNDER 35 U.S.C. § 119

The present application for patent claims benefit of U.S. Provisional Patent Application Ser. No. 62/458,359, filed Feb. 13, 2017 and U.S. Provisional Patent Application Ser. No. 62/547,697, filed Aug. 18, 2017, assigned to the assignee hereof and hereby expressly incorporated by reference herein.

BACKGROUND

Field

The present disclosure relates generally to communication systems, and more particularly, to methods and apparatus for initiating the transmission of mobility reference signals based on the signal quality of initial access signals.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a base station. The method generally includes transmitting a first set of initial access signals in different directions using, receiving a second set of one or more signals from a user equipment (UE) in response to the first set of initial access signals, and initiating transmission of, or conveying configuration of, a third set of reference signals with an indication of corresponding directions of the third set of reference signals, based on reception of the second set of signals.

Certain aspects provide a method of wireless communications by a user equipment (UE). The method generally includes receiving a first set of initial access signals transmitted from a first base station, transmitting a second set of one or more signals in response to the first set of initial access signals, and receiving at least one of a third set of reference signals or a configuration of the third set of reference signals transmitted by at least one of the first base station or a second base station, based on the second set of signals Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
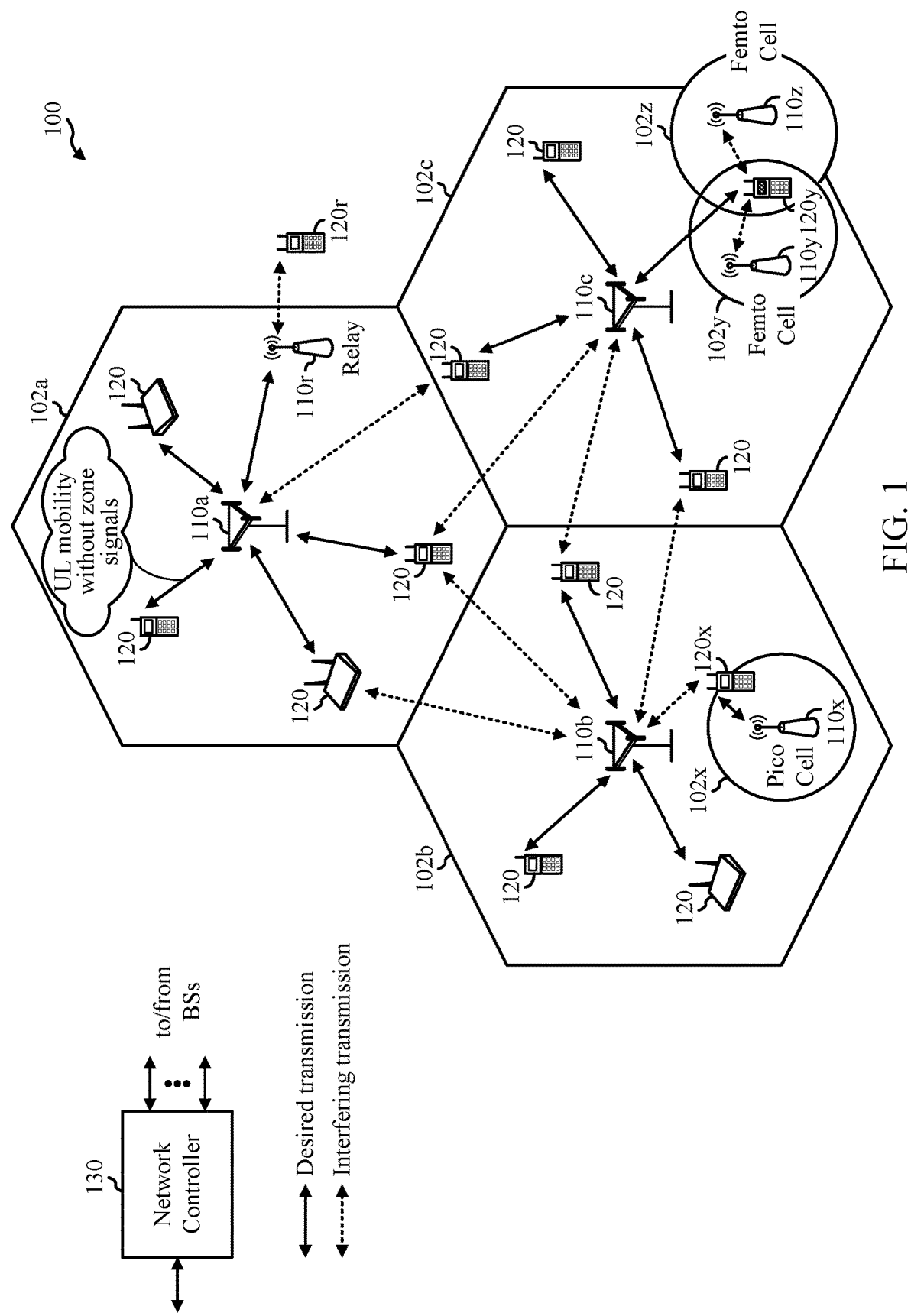
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates possible transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
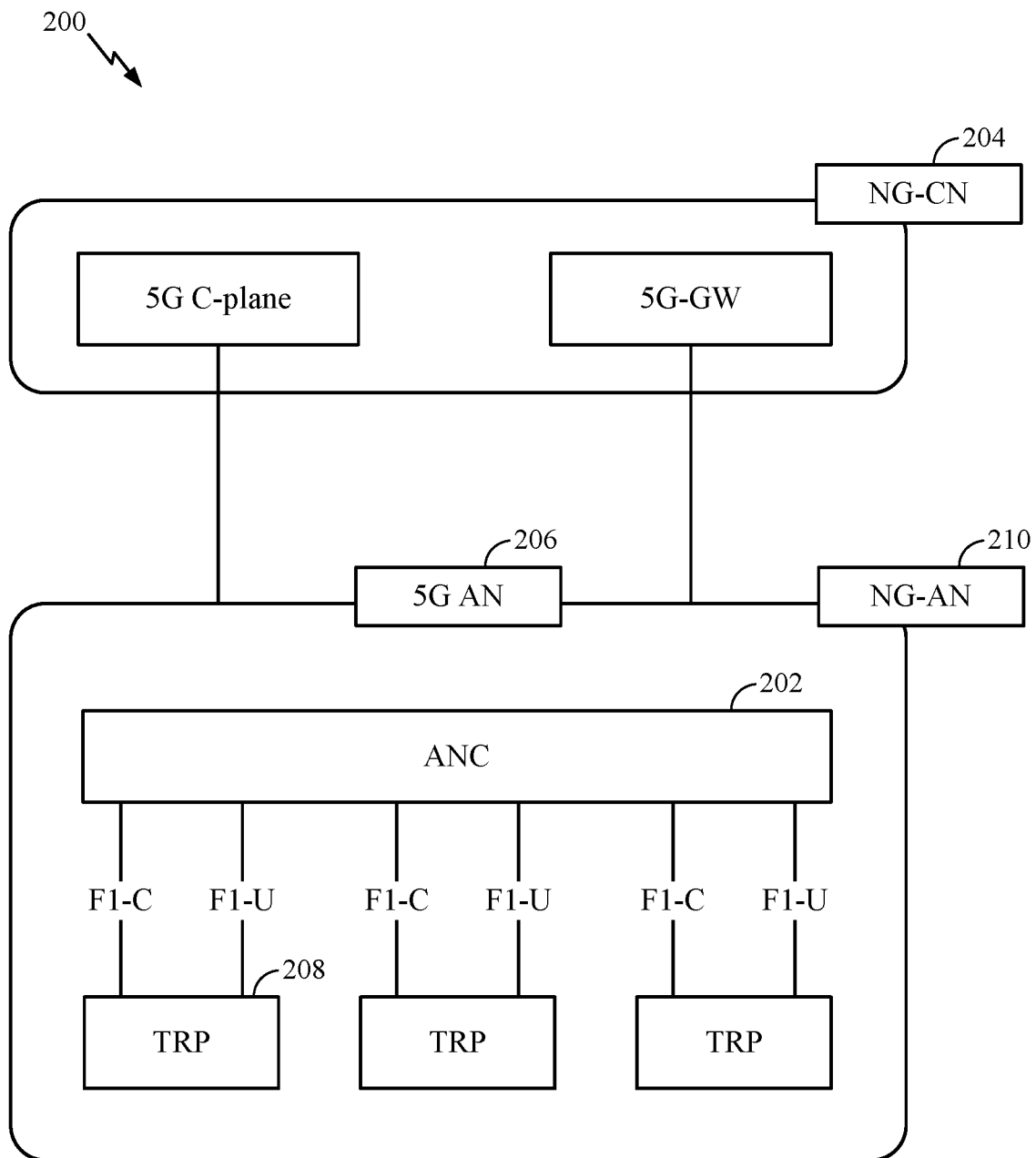
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
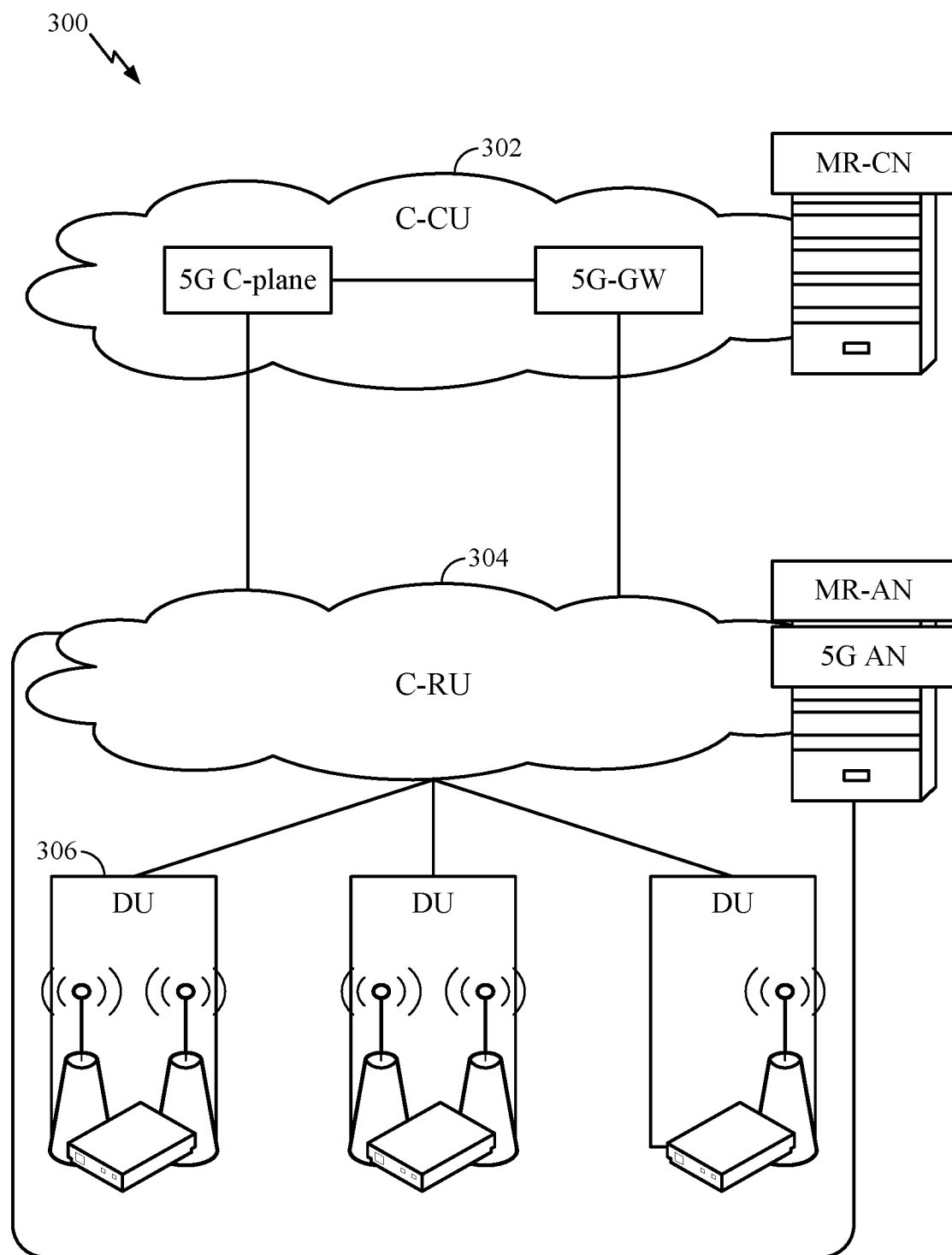
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
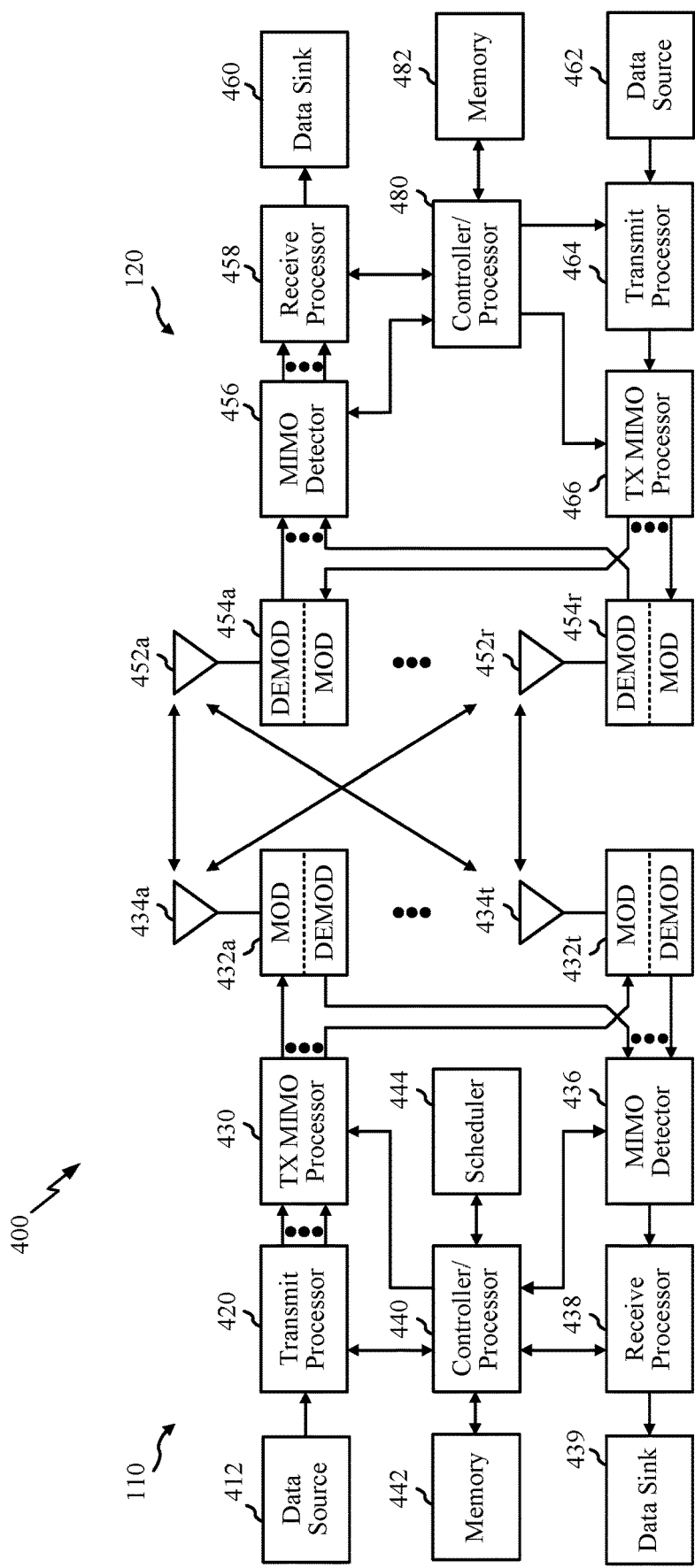
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects may include providing the antennas, as well as some Tx/Rx functionalities, such that they reside in distributed units. For example, some Tx/Rx processings may be done in the central unit, while other processing may be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 8 and 9, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
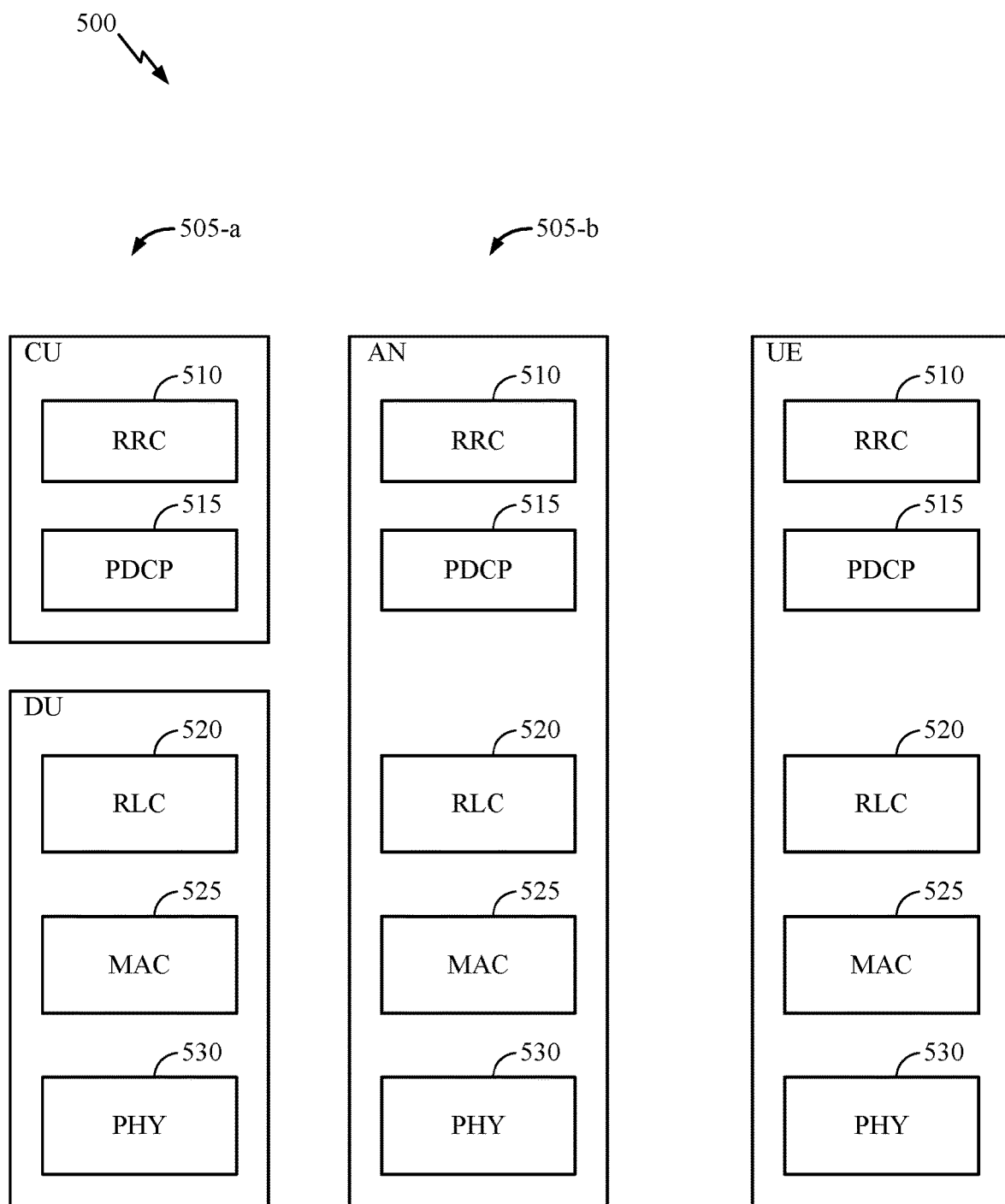
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
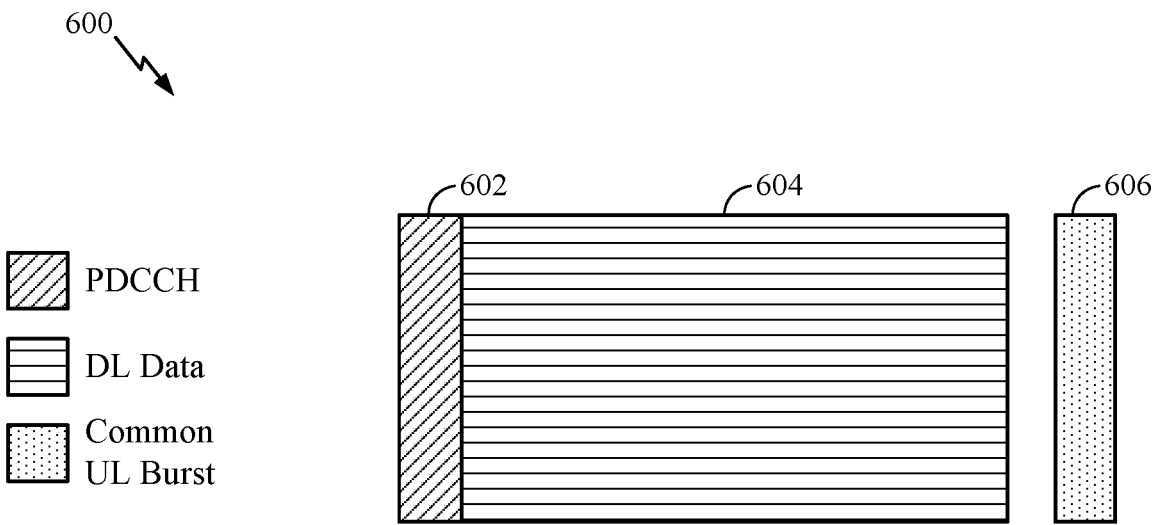
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
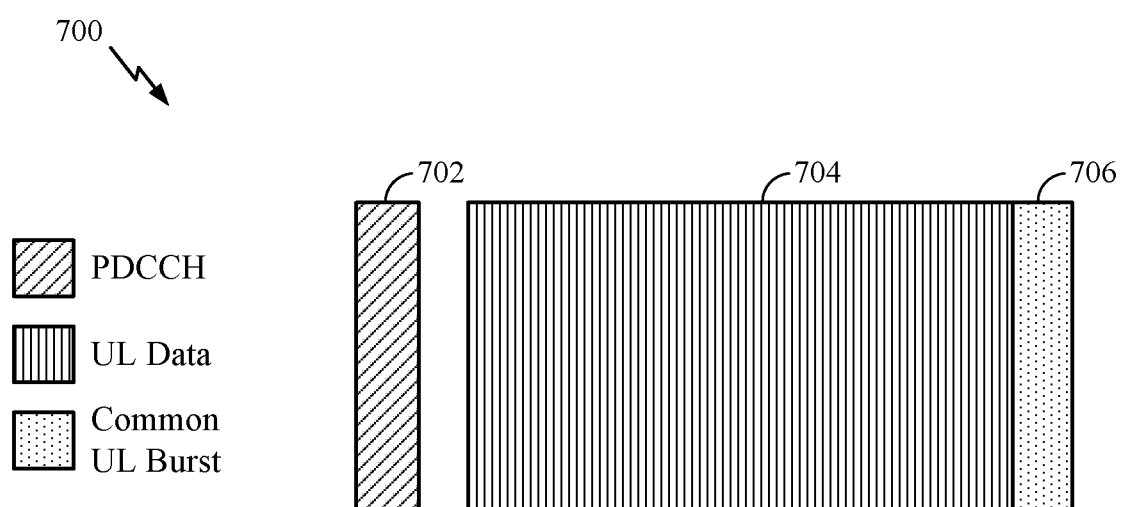
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reference Signals for Mobility

Various signals may be transmitted in wireless networks for various reasons, such as assisting with mobility decisions (e.g., whether a UE should be handed over from a current cell to a different cell). Examples of such signals include "always-on" signals used for radio resource management (RRM) measurement for L3 mobility in IDLE mode, new radio (NR) synchronization signals, or NR synchronization signals and additional DM-RS for PBCH signals (if DM-RS is supported for PBCH). For CONNECTED mode RRM measurement for L3 mobility, various other signals may be used, such as CSI-RS or other RS separate from CSI-RS. Various quality metrics may be measured for such signals, such as received signal received power (RSRP) or reference signal received quality (RSRQ).

Additional RS for mobility may be defined and transmitted on multiple beams. Such RS may be referred to as mobility reference signals. Such RS may be used for fine time/frequency tracking and estimation of quasi-colocation (QCL) parameters. In some cases, certain RS may be transmitted only in certain scenarios.

Example Initiation of Mobility Reference Signal Based on Quality of Initial Access Signals Aspects of the present disclosure provide techniques that allow a base station to initiate the transmission of mobility reference signals, based on a measured signal quality of initial access signals (e.g., as received by a UE in connected mode). In some cases, aspects of the present disclosure provide methods for conditional transmission of CSI-RS for the purpose of mobility. The UE may report on the quality of an SS, and based on this reporting, a secondary set of signals may be transmitted (by either a serving cell or a neighbor cells). The transmission of a mobility reference signal may be triggered by the reception of a UE initial access signal. In particular, one gNB may coordinate with another gNB in transmitting a mobility reference signal. The measured signal quality may include at least one of a measured channel quality indicator (CQI), signal to noise ratio (SNR), signal to interference and noise ratio (SINR), reference signal received power (RSRP), received signal strength indication (RSSI), reference signal received quality (RSRQ), beam quality information (BQI), channel state information (CSI), or interference measurement.

Figure 8:
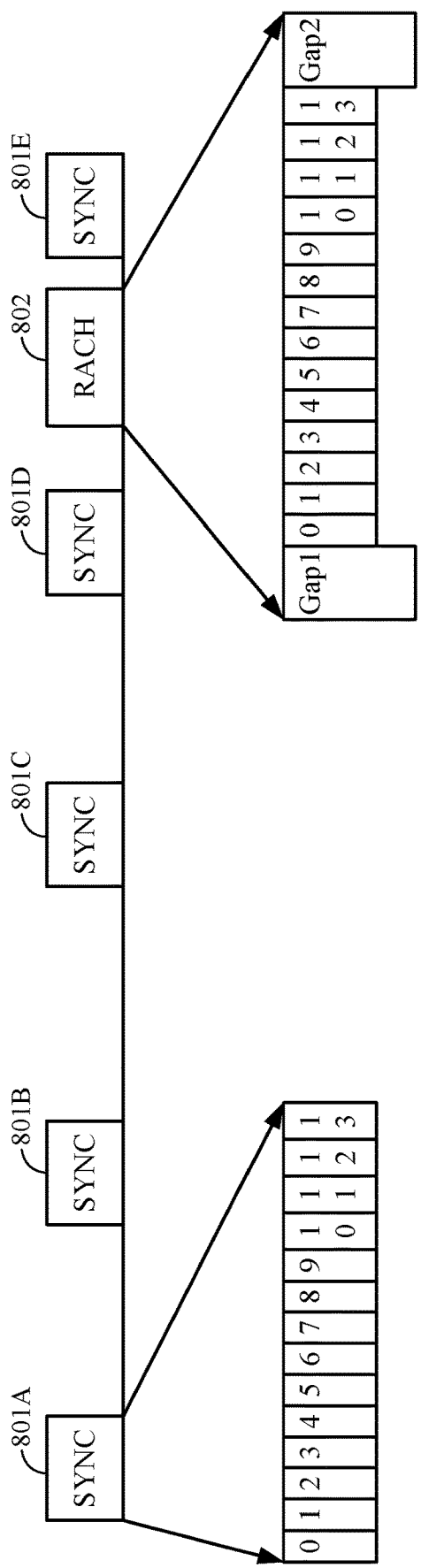
FIGS. 8 and 9 illustrate an example initial access framework, in accordance with aspects of the present disclosure.
Figure 9:
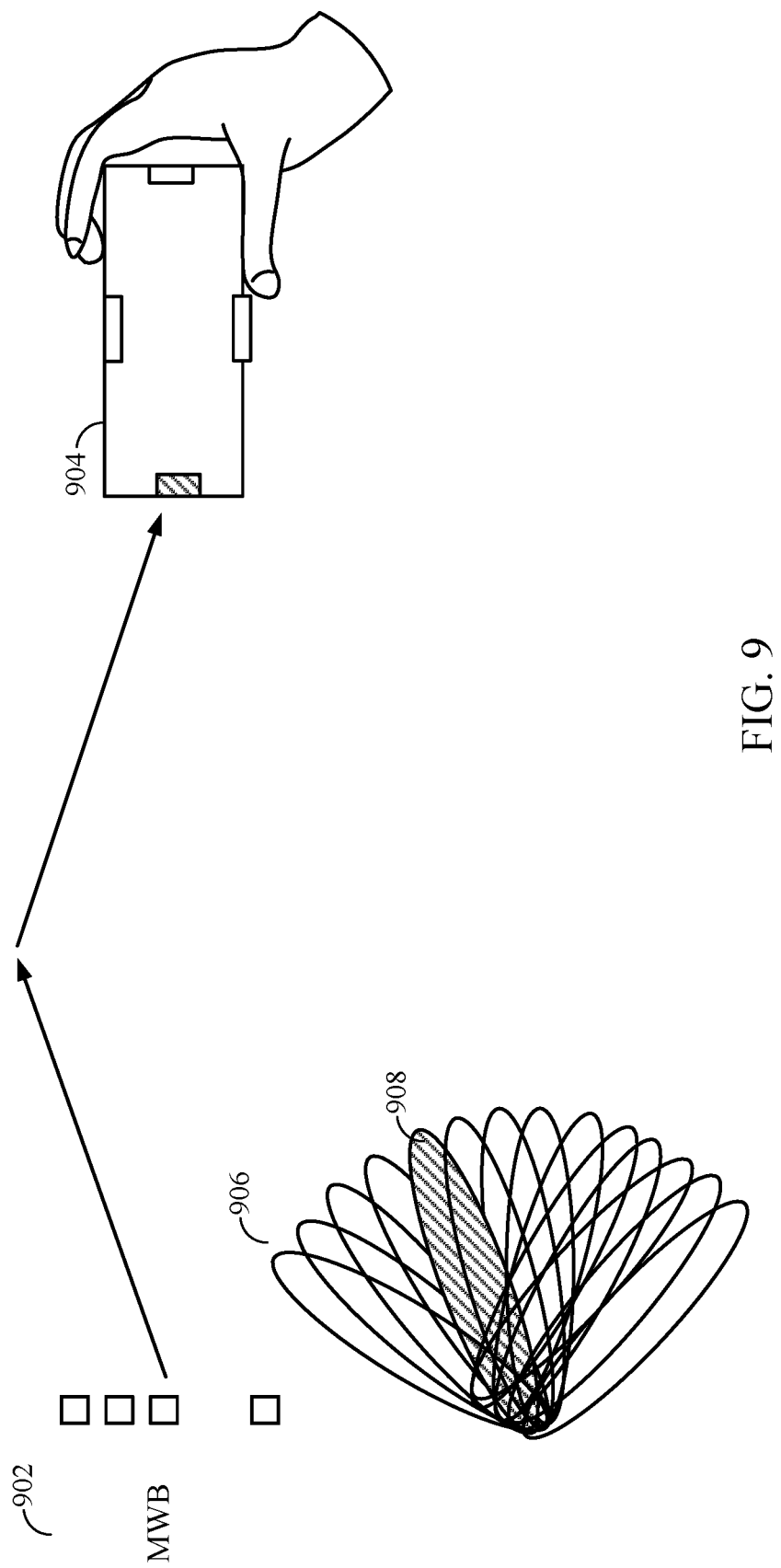

FIGS. 8 and 9 illustrate an example initial access framework, in accordance with aspects of the present disclosure. As illustrated in FIG. 9, a BS 902 (MWB) may transmit (sweep) in different directions (using different beams 906) while transmitting SYNC signals 801A-801E as shown in FIG. 8. In turn, a UE 904 may respond to such SYNC signals 801A-801E by transmitting RACH signals 802. As illustrated in FIG. 8, the SYNC signals 801A-801E and RACH signals 802 may each take 14 symbols (0-13). In some cases, the UE 904 may transmit the RACH signal 802 in a same signal that the UE 904 received a best initial beam. By receiving on the same beams used for transmitting the SYNC signals 801A-801E, the BS 902 may be able to determine which transmit beam 906 was best (e.g., based on the receive beam and symbol the BS 906 receives a RACH transmission 802 on). In the example illustrated in FIG. 9, a best initial access beam 908 is indicated.

In some cases, the SYNC signals may be transmitted periodically. While the SYNC signals are transmitted via multiple antenna ports, simultaneously in multiple directions, the UE may be unable to distinguish the directions when the transmissions occupy the same tones. In other words, as noted above, the UE may only know that the signal quality in one of the symbols and may transmit RACH in the corresponding symbol. When receiving RACH in that symbol, the base station may then know the best direction and use this for future transmissions and/or refinement.

Aspects of the present disclosure may help a base station initiate transmission of mobility reference signals, when appropriate (e.g., based on initial access signal reception at the UE).

Figure 10:
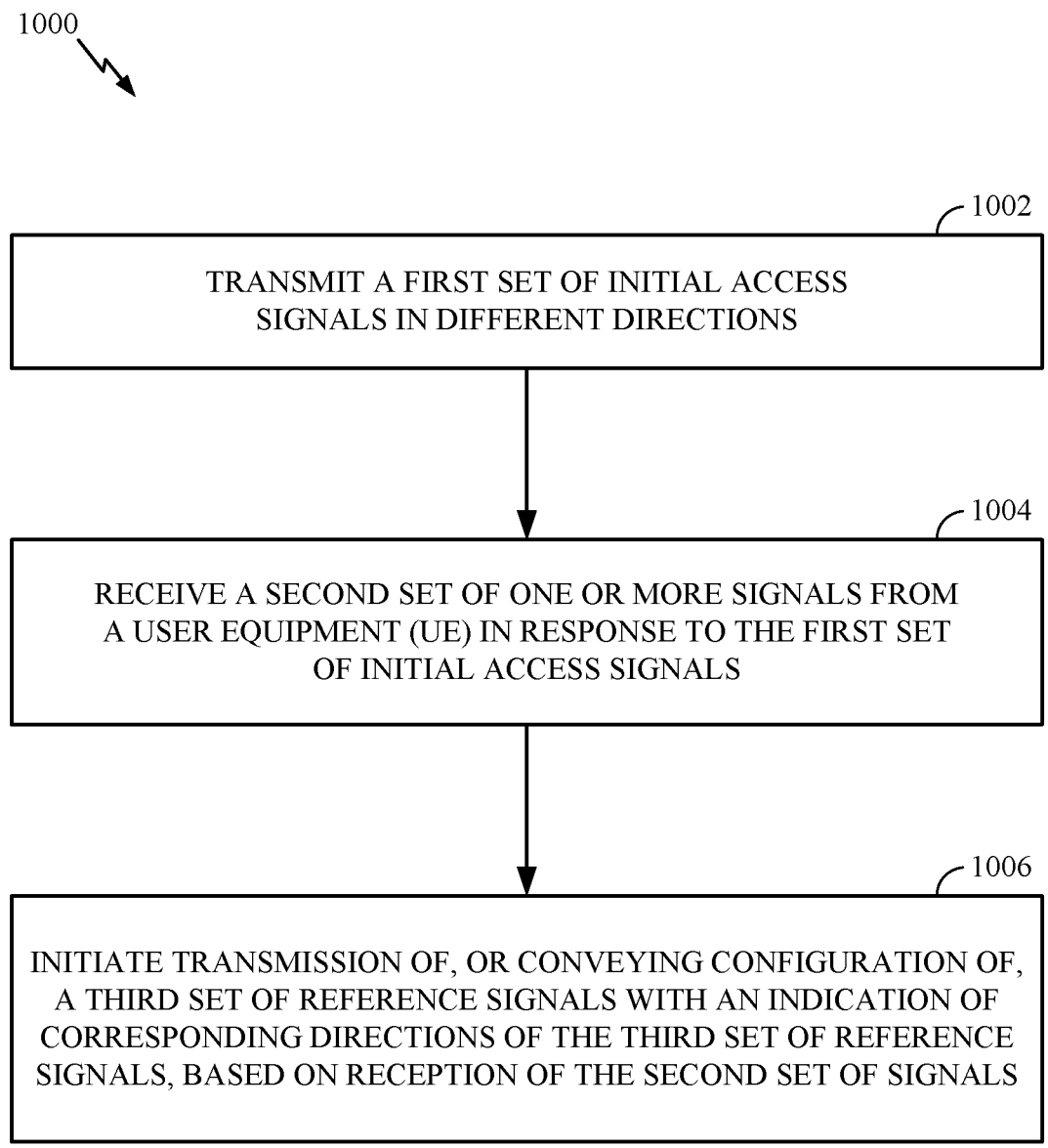
FIG. 10 illustrates example operations for wireless communications by a base station, in accordance with aspects of the present disclosure.

FIG. 10 illustrates example operations 1000 for wireless communications by base station, according to aspects of the present disclosure. Operations 1000 begin, at 1002, by transmitting a first set of initial access signals in different directions.

Figure 11:
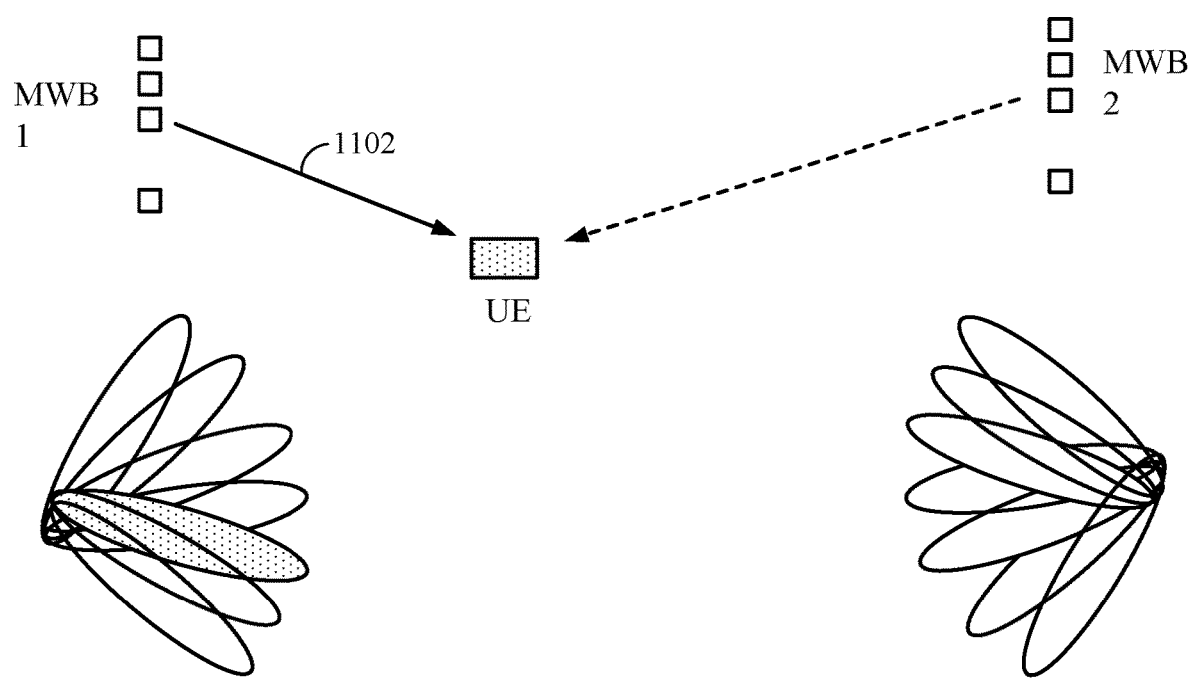
FIGS. 11 and 12 illustrate example initial access signal transmissions, in accordance with aspects of the present disclosure.

For example, as illustrated in FIG. 11, a first base station (MWB1) may transmit initial access signals 1102. The initial access signals 1102 may be transmitted through spatial multiplexing. As noted above, the initial access signals 1102 may occupy a same set of tones, such that the UE cannot distinguish the individual beams (which may be broad beams for initial access). In the example in FIG. 11, the UE is located such that the UE may only detect initial access signals from MWB1 (and not a second base station, MWB2).

At 1004, the base station receives a second set of one or more signals from a user equipment (UE) in response to the first set of initial access signals. In one or more cases, the base station receives the second set of one or more signals through one or more of a random access channel (RACH), scheduling request (SR) channel, beam recovery request channel, physical uplink control channel (PUCCH), or a physical uplink shared channel (PUSCH).

Figure 12:
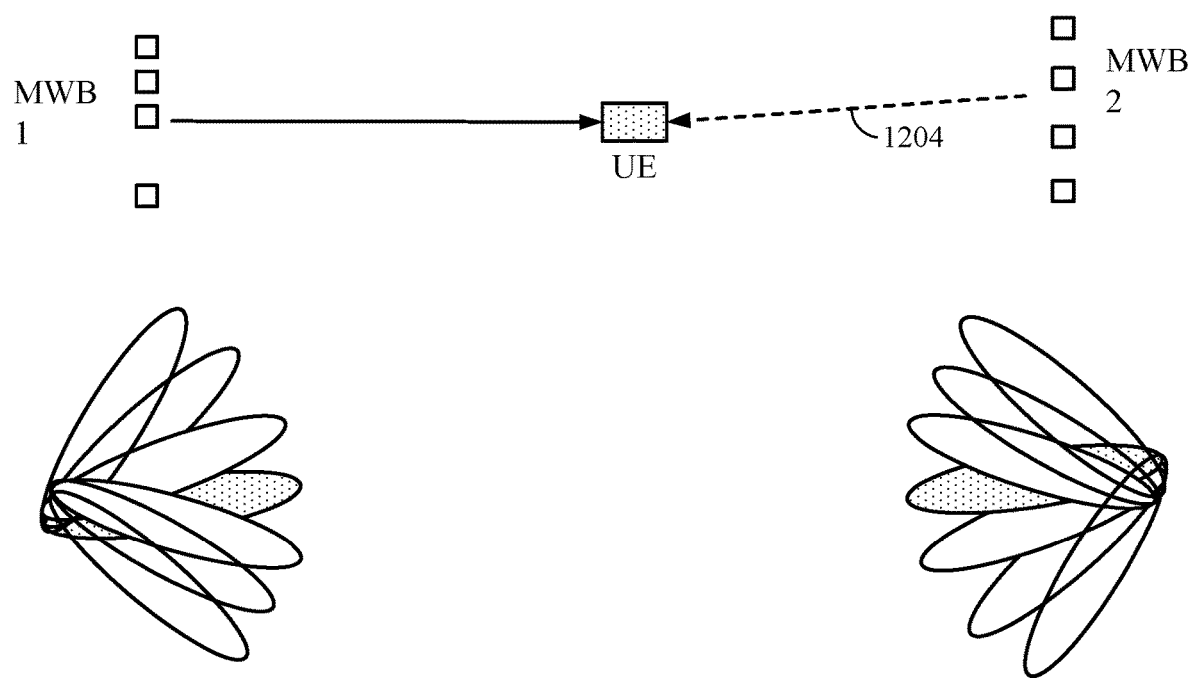

For example, the UE may transmit an indication of reception of initial access signals 1102 received from MWB1. As illustrated in FIG. 12, once the UE moves to a cell edge, the UE may also detect initial access signals 1204 from MWB2. While the UE still cannot detect the individual beams of MWB2, the UE may still inform MWB1 that the UE can detect the initial access signals 1204 of MWB2.

At 1006, the base station initiates transmission of, or conveying configuration of, a third set of reference signals with an indication of corresponding directions of the third set of reference signals, based on reception of the second set of signals. In one or more cases, the first base station may indicate the corresponding directions of the third set of reference signals by conveying their quasi-colocation (QCL) relationship with the first set of initial access signals. Further, the first base station may indicate the QCL relationship between the corresponding directions by conveying the QCL relationship between antenna ports that are used to transmit the first set of initial access signals and the third set of reference signals. In some cases, the configuration may include one or more parameters that include a bandwidth, a periodicity pattern, a time synchronization reference, a frequency resource location, a reference signal (RS) timing, a configurable numerology, or an association between CSI-RS for RRM measurement and SS block.

Figure 13:
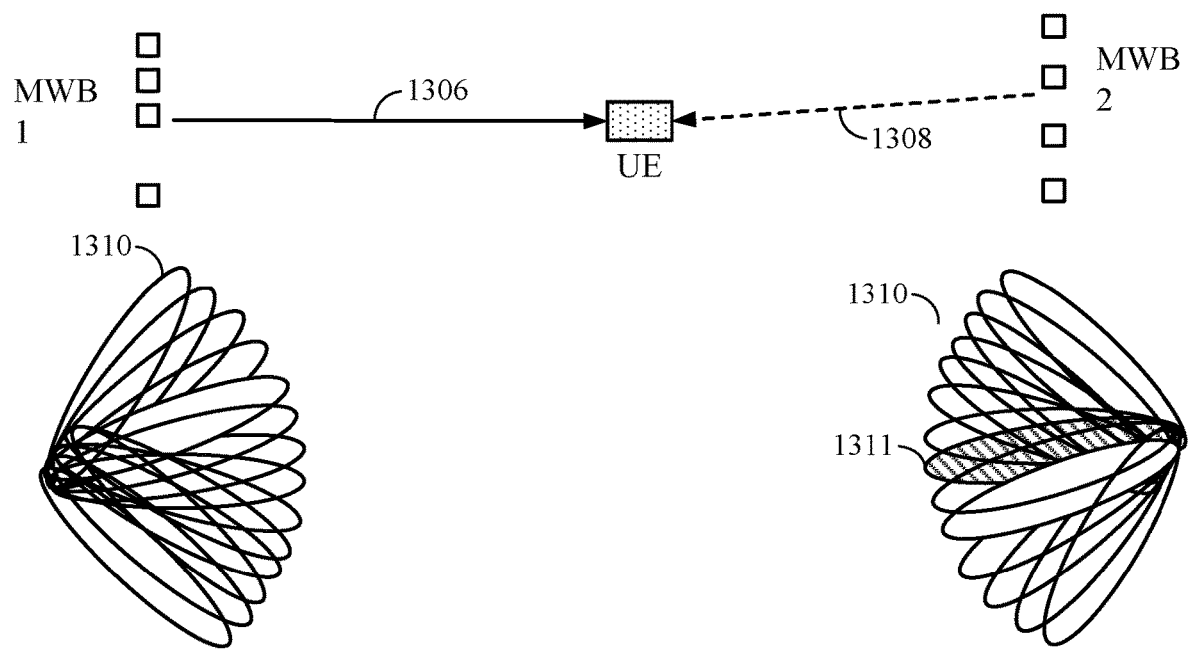
FIG. 13 illustrates example transmission of reference signals with their corresponding directions, in accordance with aspects of the present disclosure.

In one or more cases, as illustrated in FIG. 13, an MWB1 may send a third set of reference signals 1306 (e.g., narrower beams 1310 than initial access signals, with an indication of the directions, such that the UE may provide, as feedback, a best beam 1311). In some cases, MWB1 may ask that MWB2 separately transmits third reference signals 1308. In some cases, initiating transmission of the third set of reference signals may include the first base station (MWB1) requesting the second base station (MWB2) to initiate the transmission of a third set of reference signals and their corresponding directions, based on reception of the second set of signals by the second base station. In some cases, MWB1 may ask that MWB2 jointly transmit a third set of reference signals. For example, in some cases, the first base station jointly coordinates with a second base station and initiates the coordinated transmission of the third set of reference signals based on the reception of the second set of signals. In one or more cases, the MWB1 and MWB2 joint transmission may include coordinating on the timing and/or frequency resources used for such transmission. For example, the MWB1 and MWB2 may transmit a configuration of the third reference signals that is used when coordinating transmissions. The third reference signals could be, for example, CSI-RS or mobility RS.

In any case, the UE may identify individual beams and find the strongest beam of the strongest cell. This information may be fed back to MWB1 which, in turn may initiate a handover to MWB2 and/or provide the information to MWB2 so MWB2 may begin communicating with the UE using the preferred beam 1310. For example, the information that is provided may be configuration information that is conveyed to the MWB2 from the MWB1. Particularly, in one or more cases, the information includes configuration information regarding the configuration of a third set of reference signals. In accordance with one or more cases, the MWB1 may also be called a serving base station and the MWB2 may be called a neighboring base station, which in some cases may be a target base station.

Figure 14:
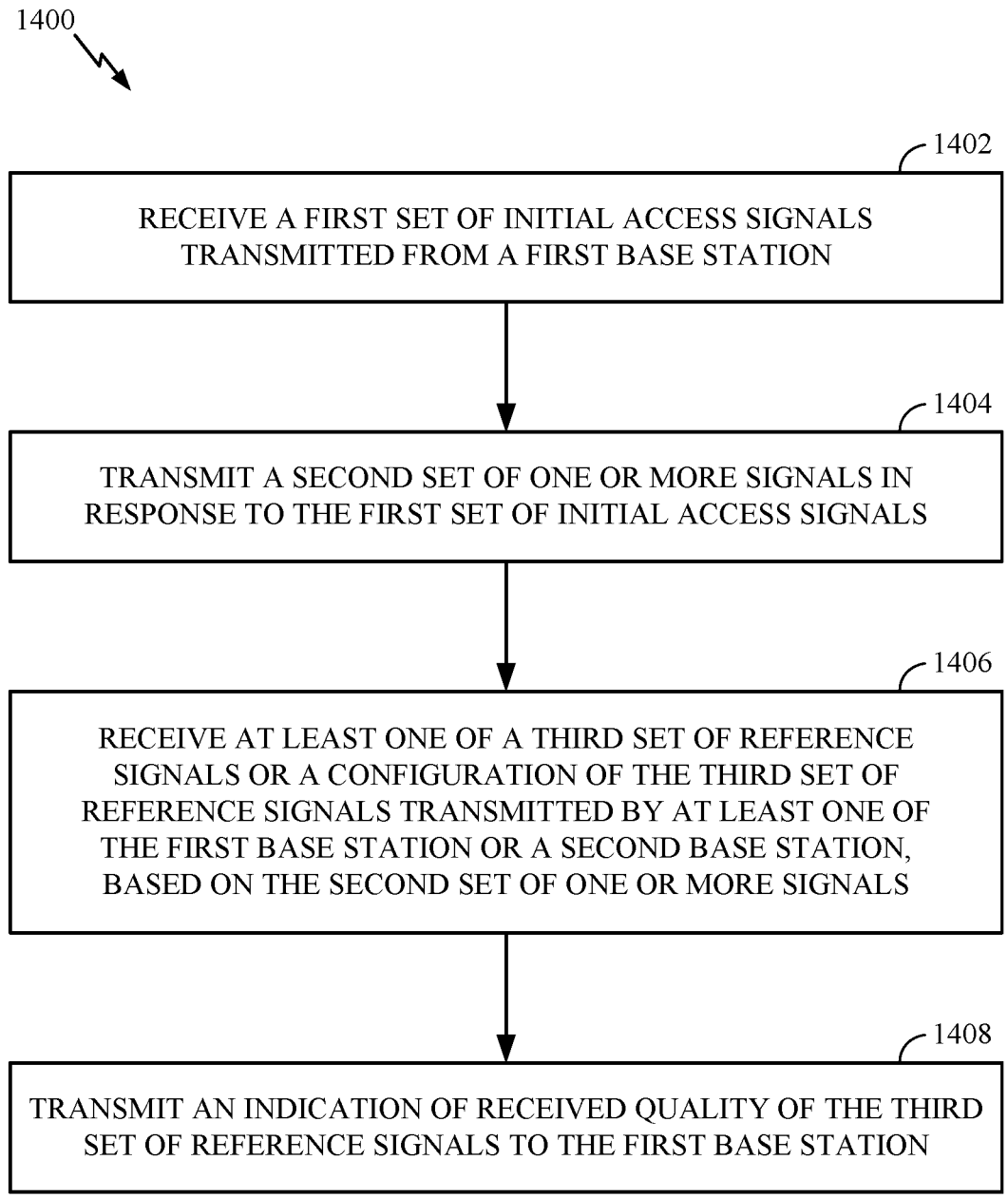
FIG. 14 illustrates example operations for wireless communications by a user equipment, in accordance with aspects of the present disclosure.

FIG. 14 illustrates example operations 1400 that may be performed by a UE. For example, operations 1400 may be considered UE-side operations that are complementary to operations 1000 shown in FIG. 10.

Operations 1400 begin, at 1402, by receiving a first set of initial access signals transmitted from a first base station. At 1404, the UE transmits a second set of one or more signals in response to the first set of initial access signals. At 1406, the UE receives at least one of a third set of reference signals or a configuration of the third set of reference signals transmitted by at least one of the first base station or a second base station, based on the second set of one or more signals. At 1408, the UE transmits an indication of received quality of the third set of reference signals to the first base station.

In one or more cases, the UE receives the configuration of the third set of reference signals using one or more downlink channels. The downlink channels may include one or more of a PDSCH, a PDCCH, an RRC signaling, a MAC Control Element (MAC CE), or a handover message. The configuration may include one or more parameters that include a bandwidth, a periodicity pattern, a time synchronization reference, a frequency resource location, a reference signal (RS) timing, a configurable numerology, or an association between CSI-RS for RRM measurement and SS block.

In some cases, a UE may be connected to a serving cell. The UE may search for initial access (primary synchronization signals (PSS), secondary synchronization signals (SSS), PBCH, and demodulation reference signals (DMRS) of PBCH) signals in SS block measurement windows. The UE may then detect a neighbor cell's initial access signals. The neighbor cell may also be referred to as a target cell. The UE informs the serving cell by conveying the detected cell ID, and if configured, reporting additional information regarding the initial access signal of the neighbor cell. The serving cell may already have the configuration of channel state information reference signals (CSI-RS) or mobility reference signals (MRS), which may also be referred to simply as CSI-RS/MRS, of the detected neighbor cell. Otherwise, the serving cell may have the detected neighbor cell provide configuration information to the serving cell (e.g., via a request). Therefore, referring back to FIG. 10, as an alternative to (or in addition to) initiating transmission of the third reference signals, the neighboring base station may convey information regarding the configuration of the third set of reference signals (e.g., to the serving cell). The serving cell may then convey the configuration of the third set of reference signals to the UE. Upon receiving the configuration from the serving cell, the UE may look for the third set of reference signal from the detected neighbor cell and may then receive the third set of reference signal from the neighbor cell. Thereafter, UE may send the quality of the third set of reference signal to the serving cell.

Figure 15:
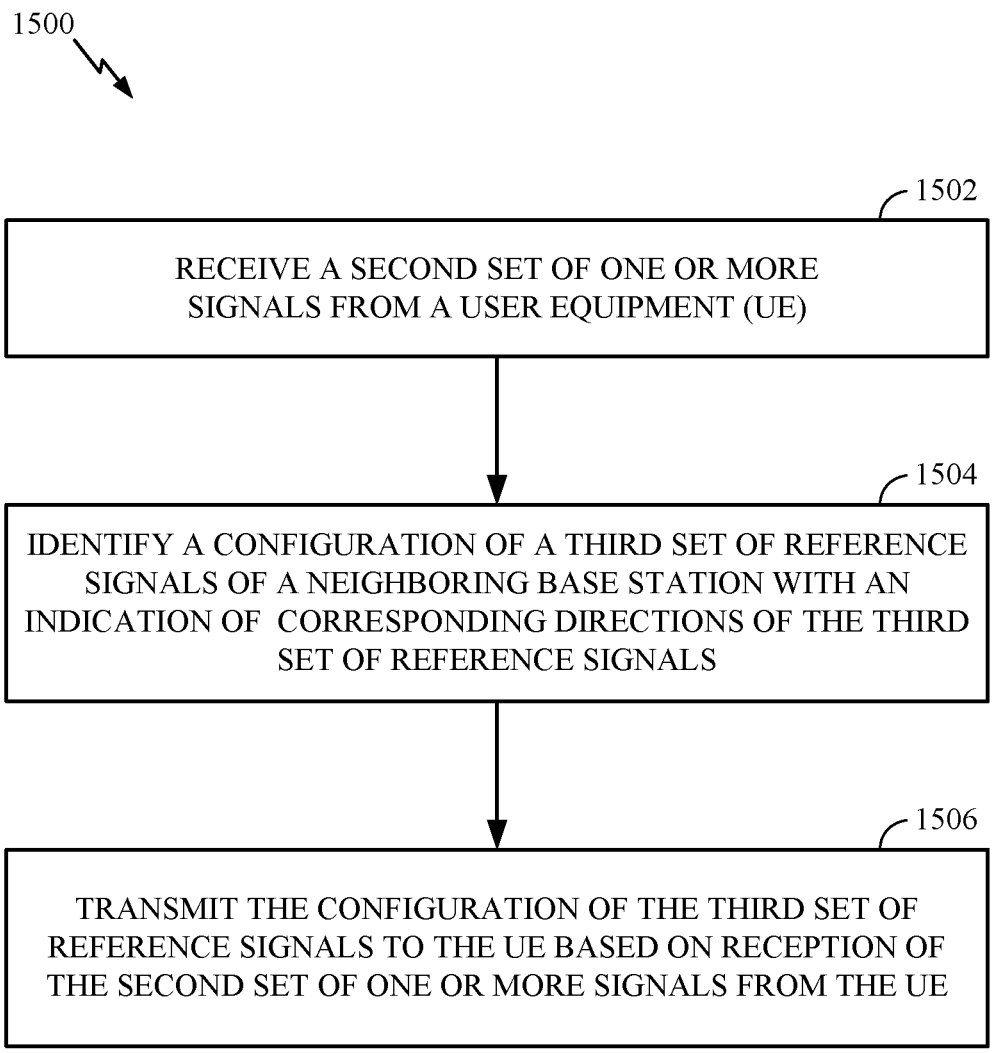
FIG. 15 illustrates example operations for wireless communications by a serving base station, in accordance with aspects of the present disclosure.

FIG. 15 illustrates example operations 1500 for wireless communications by a serving base station, in accordance with aspects of the present disclosure.

The operations 1500 include, at 1502, receiving a second set of one or more signals from a user equipment (UE). At 1504, the operations 1500 include identifying a configuration of a third set of reference signals of a neighboring base station with an indication of corresponding directions of the third set of reference signals. Further, at 1506, the operations include transmitting the configuration of the third set of reference signals to the UE based on reception of the second set of one or more signals from the UE. In some cases, the configuration includes one or more parameters that include a bandwidth, a periodicity pattern, a time synchronization reference, a frequency resource location, a reference signal (RS) timing, a configurable numerology, or an association between CSI-RS for RRM measurement and SS block.

In one or more cases, one or more antenna ports may include quasi-colocation (QCL). QCL may be defined such that two antenna ports are said to be quasi co-located if properties of the channel over which a symbol on one antenna port is conveyed may be inferred from the channel over which a symbol on the other antenna port is conveyed.

QCL may support one or more different functionalities. For example, QCL may support beam management functionality: at least including spatial parameters; frequency/timing offset estimation functionality: at least including Doppler/delay parameters; and/or RRM management functionality: at least including average gain.

For DM-RS antenna ports, NR may support either that all ports are quasi-collocated or that not all ports are quasi-collocated. DM-RS ports grouping may be supported, and DM-RS ports within one group may be QCL-ed, and DM-RS ports in different groups may be non-QCLed. NR may support with and without a downlink indication to derive QCL assumption for assisting UE-side beamforming for downlink control channel reception.

For CSI-RS antenna ports, indication of QCL between the antenna ports of two CSI-RS resources may be supported. By default, no QCL may be assumed between antenna ports of two CSI-RS resources. Partial QCL parameters (e.g., only spatial QCL parameter at UE side) may be considered. For downlink, NR may support CSI-RS reception with and without beam-related indication. When beam-related indication is provided, information pertaining to UE-side beamforming/receiving procedure used for CSI-RS-based measurement may be indicated through QCL to UE. QCL information may include spatial parameter(s) for UE side reception of CSI-RS ports.

Indication of QCL assumption associated with subset of QCL parameters between the antenna ports of two RS resources may be supported. By default (i.e., the UE is not indicated), antenna port(s) transmitted on different CCs may not be assumed to be quasi-collocated except for spatial domain QCL assumptions.

In one or more cases, if two Gnb TX antenna ports are spatially quasi-collocated (QCLed), a UE may receive from these two Gnb TX antenna ports with the same RX beam. If Gnb transmits a CSI-RS signal that is QCLed with an initial access signal, UE may use the same RX beam that the UE previously used to detect the initial access signal to detect the new CSI-RS signal.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a first base station, comprising:
    transmitting a first set of initial access signals in different directions;
    receiving a second set of one or more signals from a user equipment (UE) in response to the first set of initial access signals; and
    conveying configuration of a third set of reference signals with an indication of corresponding directions of the third set of reference signals based on reception of the second set of one or more signals,
    wherein the first base station indicates the corresponding directions of the third set of reference signals by conveying a quasi-colocation (QCL) relationship of each reference signal in the third set of reference signals with an initial access signal in the first set of initial access signals.

2. The method of claim 1, wherein the configuration includes one or more parameters that include a bandwidth, a periodicity pattern, a time synchronization reference, a frequency resource location, a reference signal timing, a configurable numerology, or an association between channel state information reference signals (CSI-RS) for radio resource management (RRM) measurement and synchronization signal (SS) block.

3. The method of claim 1, wherein the third set of reference signals comprise at least one of: channel state information reference signals (CSI-RS) or mobility reference signals (MRS).

4. The method of claim 1, wherein the first set of initial access signals comprise at least one of: primary synchronization signals (PSS), secondary synchronization signals (SSS), physical broadcast channel (PBCH) signals or demodulation reference signal (DMRS) of PBCH signals.

5. The method of claim 1, wherein the first base station indicates corresponding directions of transmission of the third set of reference signals by conveying the QCL relationship between an antenna port used to transmit the initial access signal of the first set of initial access signals and each reference signal in the third set of reference signals.

6. The method of claim 1, wherein conveying the third set of reference signals comprises requesting a second base station to initiate transmission of the third set of reference signals to corresponding directions of transmission of the third set of reference signals.

7. The method of claim 1, wherein the first base station jointly coordinates with a second base station and initiates a coordinated transmission of the third set of reference signals.

8. The method of claim 1, further comprising:
    receiving an indication of a received quality of the third set of reference signals from the UE; and using the received quality to determine if the UE should be handed over to a neighboring cell.

9. A method of wireless communications by a user equipment (UE), comprising:
receiving a first set of initial access signals transmitted from a first base station;
transmitting a second set of one or more signals in response to the first set of initial access signals;
receiving at least one of a third set of reference signals transmitted by at least one of the first base station or a second base station, based on the second set of one or more signals; and
receiving an indication of corresponding directions of the third set of reference signals from the first base station, wherein the corresponding directions of the third set of reference signals are indicated by conveying a quasi-colocation (QCL) relationship of each reference signal in the third set of reference signals with an initial access signal in the first set of initial access signals.

10. The method of claim 9, further comprising:
transmitting an indication of received quality of the third set of reference signals to the first base station.

11. The method of claim 9, wherein:
the UE receives the at least one of the third set of reference signals using one or more downlink channels, and
the one or more downlink channels include one or more of a physical downlink (DL) shared channel (PDSCH), a physical DL control channel (PDCCH), an radio resource control (RRC) signaling, a medium access control (MAC) control element (MAC CE), or a handover message.

12. The method of claim 9, wherein the third set of reference signals are defined by one or more parameters that include a bandwidth, a periodicity pattern, a time synchronization reference, a frequency resource location, a reference signal timing, a configurable numerology, or an association between channel state information reference signals (CSI-RS) for radio resource management (RRM) measurement and synchronization signal (SS) block.

13. The method of claim 9, wherein the UE receives the indication of corresponding directions of the third set of reference signals from the second base station.

14. The method of claim 9, wherein the first base station indicates corresponding directions of transmission of the third set of reference signals by conveying the QCL relationship between an antenna port used to transmit the initial access signal of the first set of initial access signals and each reference signal in the third set of reference signals.

15. The method of claim 10, where the UE transmits the indication of received quality of the third set of reference signals in one or more combinations of physical uplink control channel (PUCCH), physical uplink shared channel (PUSCH), scheduling request and random access channel (RACH).

16. The method of claim 9, wherein the third set of reference signals comprise at least one of: channel state information reference signals (CSI-RS) or mobility reference signals (MRS).

17. The method of claim 9, wherein the first set of initial access signals comprise at least one of: primary synchronization signals (PSS), secondary synchronization signals (SSS), physical broadcast channel (PBCH) signals or demodulation reference signal (DMRS) of PBCH signals.

18. The method of claim 9, wherein the first base station jointly coordinates with the second base station and initiates a coordinated transmission of the third set of reference signals.

19. The method of claim 10, wherein received quality comprises at least one of a measured channel quality indicator (CQI), signal to noise ratio (SNR), signal to interference and noise ratio (SINR), reference signal received power (RSRP), received signal strength indication (RSSI), reference signal received quality (RSRQ), beam quality information (BQI), beam index report, channel state information (CSI), or interference measurement.

20. The method of claim 9, further comprising:
measuring a quality of at least one of secondary synchronization signals (SSS) or demodulation reference signals (DMRS) for physical broadcast channel (PBCH) signals; and
providing an indication of the measured quality.

21. A method of wireless communications by a base station, comprising:
receiving a second set of one or more signals from a user equipment (UE) in response to a first set of initial access signals;
identifying a configuration of a third set of reference signals of a neighboring base station with an indication providing the UE corresponding directions of transmission of the third set of reference signals, based on reception of the second set of one or more signals, the indication conveying a quasi-colocation (QCL) relationship of each reference signal in the third set of reference signals with an initial access signal of the first set of initial access signals; and
transmitting the configuration of the third set of reference signals to the UE based on reception of the second set of one or more signals from the UE.

22. The method of claim 21, wherein the configuration includes one or more parameters that include a bandwidth, a periodicity pattern, a time synchronization reference, a frequency resource location, a reference signal timing, a configurable numerology, or an association between channel state information reference signals (CSI-RS) for radio resource management (RRM) measurement and SS block.

23. The method of claim 21, wherein the method further comprises:
conveying the second set of one or more signals to the neighboring base station; and
receiving the configuration of the third set of reference signals from the neighboring base station in response to conveying the second set of one or more signals.

24. The method of claim 21, wherein the UE receives the indication of the corresponding spatial directions of transmission of the third set of reference signals from the base station.

25. The method of claim 21, wherein the base station indicates corresponding directions of transmission of each reference signal in the third set of reference signals by conveying the QCL relationship between an antenna port used to transmit the initial access signal of the first set of initial access signals and each reference signal in the third set of reference signals.

26. The method of claim 1, wherein:
the corresponding directions of the third set of reference signals indicate a first direction of a first reference signal in the third set of reference signals; and
the QCL relationship is indicative of whether the first direction corresponding to the first reference signal is a same direction as a first initial access signal of the first set of initial access signals.

27. The method of claim 9, wherein receiving the at least one of the third set of reference signals further comprises receiving a first reference signal of the third set of reference signals using a same receive beam used to receive a first initial access signal of the first set of initial access signals.

28. A base station, comprising:
a memory; and
a processor coupled to the memory, the processor and the memory configured to:
transmit a first set of initial access signals in different directions;
receive a second set of one or more signals from a user equipment (UE) in response to the first set of initial access signals; and
convey configuration of a third set of reference signals with an indication of corresponding directions of the third set of reference signals based on reception of the second set of one or more signals,
wherein the base station indicates the corresponding directions of the third set of reference signals by conveying a quasi-colocation (QCL) relationship of each reference signal in the third set of reference signals with an initial access signal in the first set of initial access signals.

29. The base station of claim 28, wherein the third set of reference signals comprise at least one of: channel state information reference signals (CSI-RS) or mobility reference signals (MRS).

30. The base station of claim 28, wherein the first set of initial access signals comprise at least one of: primary synchronization signals (PSS), secondary synchronization signals (SSS), physical broadcast channel (PBCH) signals or demodulation reference signal (DMRS) of PBCH signals.

31. The base station of claim 28, wherein:
the corresponding directions of the third set of reference signals indicate a first spatial direction of a first reference signal in the third set of reference signals; and
the QCL relationship is indicative of whether the first spatial direction corresponding to the first reference signal is a same spatial direction as a first initial access signal of the first set of initial access signals.

32. A user equipment (UE), comprising:
a memory; and
a processor coupled to the memory, the processor and the memory configured to:
receive a first set of initial access signals transmitted from a first base station;
transmit a second set of one or more signals in response to the first set of initial access signals;
receive at least one of a third set of reference signals transmitted by at least one of the first base station or a second base station, based on the second set of one or more signals; and
receive an indication of corresponding directions of the third set of reference signals from the first base station, wherein the corresponding directions of the third set of reference signals are indicated by conveying a quasi-colocation (QCL) relationship of each reference signal in the third set of reference signals with an initial access signal in the first set of initial access signals.

33. The UE of claim 32, wherein the third set of reference signals comprise at least one of: channel state information reference signals (CSI-RS) or mobility reference signals (MRS).

34. The UE of claim 32, wherein the first set of initial access signals comprise at least one of: primary synchronization signals (PSS), secondary synchronization signals (SSS), physical broadcast channel (PBCH) signals or demodulation reference signal (DMRS) of PBCH signals.

35. The UE of claim 32, wherein the processor and the memory, being configured to receive the at least one of the third set of reference signals, are further configured to receive a first reference signal of the third set of reference signals using a same receive beam used to receive a first initial access signal of the first set of initial access signals.

* * * * *